(12) United States Patent
Hattori et al.

(10) Patent No.: US 6,668,128 B2
(45) Date of Patent: Dec. 23, 2003

(54) OPTICAL FIBER WIRE HOLDER, FUSION-SPLICING APPARATUS, CLEAVING APPARATUS, AND OPTICAL FIBER SPLICING METHOD

(75) Inventors: Kazunari Hattori, Kanagawa (JP); Tsutomu Watanabe, Research Triangle Park, NC (US); Yutaka Ito, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/901,144

(22) Filed: Jul. 10, 2001

(65) Prior Publication Data

US 2002/0031323 A1 Mar. 14, 2002

(30) Foreign Application Priority Data

Jul. 10, 2000 (JP) .......................... 2000-207977

(51) Int. Cl.[7] .......................... G02B 6/255; G02B 6/00
(52) U.S. Cl. .......................... 385/136; 385/96; 385/97; 385/134
(58) Field of Search .......................... 385/136, 96, 134, 385/97

(56) References Cited

U.S. PATENT DOCUMENTS

| | | | | |
|---|---|---|---|---|
| 5,024,363 A | * | 6/1991 | Suda et al. | 225/2 |
| 5,123,581 A | * | 6/1992 | Curtis et al. | 225/104 |
| 5,524,163 A | * | 6/1996 | Kobayashi et al. | 219/121.45 |
| 5,839,635 A | * | 11/1998 | Mansfield et al. | 225/105 |
| 5,842,622 A | * | 12/1998 | Mansfield et al. | 225/105 |
| 6,190,057 B1 | * | 2/2001 | Osaka et al. | 385/134 |
| 6,275,635 B1 | * | 8/2001 | Jimenez Cortes | 385/115 |

FOREIGN PATENT DOCUMENTS

JP      9-113572      5/1997

* cited by examiner

*Primary Examiner*—John D. Lee
*Assistant Examiner*—Tina M Lin
(74) *Attorney, Agent, or Firm*—McDermott, Will & Emery

(57) ABSTRACT

An optical fiber holder is provided which can accurately position the tip of an optical fiber during fusion-splice. A holder 2 can be used without removing an optical fiber 1 clamped in a stripping apparatus, cleaving apparatus and fusion-splicing apparatus in common. The optical fiber is clamped between a holder main body 2a and clamping members 3a, 3b at the coated portion thereof and between a V-groove portion 2b and a clamping member 7 at the tip thereof. The holder is positioned and mounted on a holder mount 4. Since the optical fiber is kept clamped in the holder throughout the steps of stripping, cleaving and fusion-splicing, the tip of the optical fiber 1a can be accurately positioned during fusion-splice.

6 Claims, 7 Drawing Sheets

PUSHED DIRECTION

ALIGNED DIRECTION

OPTICAL FIBER WIRE HOLDER, FUSION-SPLICING APPARATUS, CLEAVING APPARATUS, AND OPTICAL FIBER SPLICING METHOD

BACKGROUND OF THE INVENTION

The present invention relates to a fusion-splicing method for splicing optical fibers, a cleaving apparatus for cleaving the tip of optical fibers, a fusion-splicing apparatus for splicing optical fibers which have been cleaved at the tip thereof, and an optical fiber holder.

As a method for splicing optical fibers, a fusion-splicing method has been practiced. This fusion-splicing method consists of the following three steps. The first step involves stripping the coating from the tip of the optical fiber using a stripping apparatus called stripper (remover). The second step comprises cleaving the optical fiber thus exposed to a predetermined length using an optical fiber cleaving apparatus. The third step comprises fusion-splicing the optical fibers with the tip thereof abutted to each other using a fusion-splicing apparatus.

In the fusion-splicing step, electric discharge starts while the tip of the optical fibers are kept at a predetermined distance and positioned at the fusion starting position. Subsequently, one or both of the optical fibers are pushed in a direction such that the distance between the tip thereof is reduced. Thereafter, the tip of the optical fibers are spliced at the fusion end position to complete fusion-splice. There are two methods for positioning the tip of optical fibers to each other. The first method comprises positioning the coated portion of the optical fiber in the vicinity of the tip thereof with the optical fiber exposed at the tip thereof using a V-groove. The second method comprises positioning the exposed optical fiber itself using a V-groove. In any of these methods, positioning of the tip of the optical fiber must be conducted precisely.

FIG. 9 is a diagram illustrating a structure for supporting an optical fiber in a conventional fusion-splicing apparatus. In FIG. 9, only a mechanism for supporting one of the two optical fibers is shown. In FIG. 9, the reference numeral 1 indicates a coated optical fiber, the reference numeral 1a indicates an optical fiber, the reference numeral 31 indicates an optical fiber holding table, the reference numerals 32a, 32b each indicate a clamping member, the reference numeral 33 indicates a slider mechanism, and the reference numeral 34 indicates a supporting table.

The optical fiber holding table 31 is provided with a groove (not shown) in which the optical fiber 1 having a protective coating is received. The optical fiber 1 received in the groove is clamped by the clamping members 32a, 32b. The optical fiber holding table 31 is supported on the supporting table 34 via the slider mechanism 33 in such an arrangement that it can move along the axis of the optical fiber 1 thus clamped. The supporting table 34 and the other supporting table (not shown) are disposed opposed to each other and are supported on the respective optical fiber holding table 31. These supporting tables are arranged such that they can be moved by the respective movement mechanism (not shown) to align the tip of the optical fiber 1a obtained by exposing the optical fiber 1.

Referring to the operation of this fusion-splicing apparatus, an optical fiber is set in a stripper. The optical fiber is then stripped at the tip thereof. Subsequently, the optical fiber is set in a cleaving apparatus. The optical fiber is then cleaved at the tip thereof. Thereafter, the optical fiber is set in the optical fiber holding table 31 of the fusion-splicing apparatus described in connection with FIG. 9 where it is then subjected to fusion-splice. However, the length (cleaved length) of the optical fiber thus cleaved is not constant itself. Since this fusion-splicing apparatus employs a procedure requiring the removal of the optical fiber from the cleaving apparatus and the transfer of the optical fiber to the optical fiber holding table 31, the position in the longitudinal direction of the optical fiber 1 clamped by the clamping members 32a, 32b is not constant. As a result, it takes much time to align the tip of the optical fiber. Further, since the optical fiber 1 is clamped at the tip thereof by the clamping member 32a, the coating may be curved if it is not sufficiently clamped. As a result, the position of the tip of the optical fiber 1a cannot be stably fixed with a good precision.

FIG. 10 illustrates an embodiment of the holder mechanism for fusion-splicing apparatus designed to improve the precision of fixing of an optical fiber. Like numerals are used for like parts in FIGS. 9 and 10. The description of parts similar to those of FIG. 9 will be omitted. In FIG. 10, the reference numerals 34a, 34b each indicate a supporting table, the reference numeral 35 indicates a V-groove member, and the reference numeral 36 indicates a clamping member.

As shown in FIG. 10, the V-groove member 35 and the clamping member 36 are provided besides the optical fiber holding table 31 for holding the optical fiber 1 and the clamping member 32a. The coated optical fiber 1 is clamped by the V-groove member 35 and the clamping member 36 at the position close to the tip thereof. In this arrangement, the clamping force applied to the coated optical fiber 1 at the position close to the tip thereof can be enhanced, making it possible to improve the precision of fixing of the optical fiber 1a. The V-groove member 35 is supported on the supporting table 34b. Another supporting table (not shown) is disposed opposed to the supporting table 34b. The optical fiber 1 clamped in the respective V-groove member 35 is then stripped at the tip thereof. These supporting tables are arranged such that they can be moved using the respective movement mechanism (not shown) to align the tip of the optical fiber 1a thus exposed.

In the fusion-splicing apparatus comprising the foregoing holder mechanism, when the optical fiber 1a is pushed by the slider mechanism 33 during fusion, the optical fiber holding table 31 moves forward. However, since the V-groove member 35 does not move, the optical fiber 1 makes sliding movement forward against the clamping force by the V-groove member 35 and the clamping member 36. Accordingly, when the clamping force is large, the optical fiber 1 can undergo buckling or cannot move through the V-groove, making it impossible to perform good splice. On the contrary, when the clamping force is small, the optical fiber 1 cannot be stably clamped.

FIG. 11 is a schematic diagram illustrating a holder mechanism described in Japanese Patent Unexamined Publication No. Hei. 9-113752. FIG. 11(A) is a schematic diagram. FIG. 11(B) is a sectional view of the fitting portion. Like numerals are used for like parts in FIGS. 9, 10 and 11. The description of parts similar to those of FIG. 9 will be omitted. In FIG. 11, the reference numeral 37 indicates a holder, the reference numeral 37a indicates a tapered pin, the reference numeral 38 indicates a holder mount, and the reference numeral 38a indicates a tapered hole.

Referring to the operation of this holder mechanism, the optical fiber 1 which has been stripped at the tip thereof is clamped in the holder 37. The holder 37 is prepared for each of the optical fiber 1 to be spliced. The holder 37 comprises the tapered pin 37a provided at the bottom thereof. At the holder mounting portion of the cleaving apparatus for cleaving the optical fiber 1a of the optical fiber 1 is provided a tapered hole in which the tapered pin 37a is fitted. In this arrangement, the holder 37 is positioned in the cleaving apparatus using the tapered pin 37a and the tapered hole. Accordingly, the cleaving position of the optical fiber is constant with respect to the holder 37.

In order to splice optical fibers to each other, the holder having the optical fiber 1 clamped therein is removed from the cleaving apparatus, and then mounted on the holder mount 38 of the fusion-splicing apparatus as shown in FIG. 11(A). The holder mount 38 has a tapered 38a formed at the position corresponding to the position of the tapered hole in the holder mount of the cleaving apparatus as shown in FIG. 11(B). In this arrangement, the length of the optical fiber thus cleaved is constant itself. In the fusion-splicing apparatus, too, the holder can be positioned and mounted on the holder mount 38, making it possible to mount the optical fiber 1a in such an arrangement that the tip thereof is always at a constant position.

However, since the coated optical fiber 1 is set at the position close to the tip thereof in the V-groove member 35, which has the same structure as described in connection with FIG. 10, there arises the same problems as described in connection with FIG. 10.

Further, since coated optical fibers 1 having an outer diameter of 0.25 mm, 0.4 mm, 0.9 mm, etc. are commercially available, the holder mechanism of FIG. 11 is disadvantageous in that the V-groove member 35 must be exchanged and adjusted according to the outer diameter of the coated optical fiber 1. In addition, in the case where the spliced portion is image-taken under microscope and then monitored on a monitor screen, the variation of the height of the central axis of the optical fiber 1 with the outer diameter of the optical fiber must be dealt with. In other words, every time an optical fiber 1 having an outer diameter different from that of the previous optical fiber is spliced, the position of the optical fiber or the height of the microscope or the position of the discharge electrodes must be adjusted.

In the foregoing embodiments, the coated portion of the optical fiber is clamped by a V-groove member. Similar problems occur with the case where the optical fiber stripped its coating is clamped by the V-groove member. In other words, since optical fibers 1a having an outer diameter of 80 μm, 125 μm, 150 μm, 280 μm, etc. are commercially available, the V-groove member must be exchanged or adjusted according to the outer diameter of the optical fiber in order to monitor the spliced portion without adjusting the height of the microscope even when optical fibers 1a having different outer diameters are clamped by the V-groove member.

SUMMARY OF THE INVENTION

The present invention has been worked out in the light of the foregoing circumstances. An object of the present invention is to provide an optical fiber holder, a fusion-splicing apparatus, a cleaving apparatus and a method for splicing optical fibers which can deal with coated optical fibers or optical fibers having different outer diameters and accurately positioning the tip of optical fiber during fusion-splice.

The present invention lies in an optical fiber holder which is used for a stripping apparatus, cleaving apparatus and fusion-splicing apparatus in common, comprising a holder main body having a groove for inserting an optical fiber therein and a clamping member for clamping the optical fiber inserted in the groove, and a V-groove portion provided ahead of the holder main body for inserting the optical fiber therein, wherein the V-groove portion is clamped by a clamping member which is mounted on a holder mount in the stripping apparatus, cleaving apparatus or fusion-splicing apparatus and which is compressed toward the V-groove portion by a spring member.

The present invention also lies in the foregoing optical fiber holder, wherein the optical fiber holder is prepared for each of a plurality of kinds of optical fibers having different outer diameters and the groove and the V-groove in the V-groove portion of each of the optical fiber holders are formed in such an arrangement that the central axis of the optical fiber clamped at these grooves are in the same position independent of the outer diameter of optical fiber.

The present invention further lies in a method for splicing optical fibers which comprises effecting a sequence of steps involving coating stripping, cleaning, cleaving and fusion-splice without removing the optical fiber from the optical fiber holder to splice optical fibers.

The present invention still further lies in a fusion-splicing apparatus having an optical fiber holder comprising a holder main body having a groove for inserting the optical fiber therein and a clamping member for clamping the optical fiber inserted in the groove and a V-groove portion provided ahead of the holder main body for inserting an optical fiber therein, and a holder mount for mounting the optical fiber holder thereon, characterized in that the holder mount comprises a positioning portion for positioning the optical fiber holder and a supporting portion for supporting the clamping member which is compressed toward the V-groove portion by a spring member.

The present invention still further lies in a cleaving apparatus having an optical fiber holder comprising a holder main body having a groove for inserting an optical fiber therein and a clamping member for clamping the optical fiber inserted in the groove and a V-groove portion provided ahead of the holder main body for inserting the optical fiber therein, a holder mount for mounting the optical fiber holder thereon, a cleaving blade, a V-groove member for inserting a coated optical fiber therein, and a clamping member for clamping the coated optical fiber inserted in the V-groove member, characterized in that the holder mount has a positioning portion for positioning the optical fiber holder and a supporting portion for supporting the clamping member which is compressed toward the V-groove portion by a spring member and the cleaving blade is positioned interposed between the V-groove portion and the V-groove member and is adapted to make a cleave on the optical fiber clamped between the V-groove portion and the V-groove member.

The present invention still further lies in an optical fiber holder which is used for a cleaving apparatus and fusion-splicing apparatus in common, comprising a holder main body having a groove for inserting an optical fiber therein and a clamping member for clamping the optical fiber inserted in the groove, and a V-groove portion provided ahead of the holder main body for inserting the optical fiber therein, wherein the V-groove portion is clamped by a clamping member which is mounted on a holder mount in the cleaving apparatus or fusion-splicing apparatus and which is compressed toward the V-groove portion by a spring member.

The present invention still further lies in the foregoing optical fiber holder, wherein the optical fiber holder is prepared for each of a plurality of kinds of optical fibers having different outer diameters and coated optical fibers having different outer diameters, the groove in the optical fiber holders are formed in such an arrangement that the central axis of the optical fibers clamped at these grooves are in the same position independent of the outer diameter of coated optical fiber and the V-groove in the V-groove portions are formed in such an arrangement that the central axis of optical fibers clamped at these grooves are in the same position independent of the outer diameter of coated optical fiber.

The present invention still further lies in a method for splicing optical fibers which comprises effecting a sequence of steps involving cleaving and fusion-splice without removing the optical fiber from the optical fiber holder in order to splice optical fibers.

The present invention still further lies in a fusion-splicing apparatus having an optical fiber holder comprising a holder main body having a groove for inserting an optical fiber therein and a clamping member for clamping the optical fiber inserted in the groove and a V-groove portion provided ahead of the holder main body for inserting an optical fiber therein, and a holder mount for mounting the optical fiber holder thereon, characterized in that the holder mount comprises a positioning portion for positioning the optical fiber holder and a supporting portion for supporting the clamping member which is compressed toward the V-groove portion by a spring member.

The present invention still further lies in a cleaving apparatus having an optical fiber holder comprising a holder main body having a groove for inserting an optical fiber therein and a clamping member for clamping the optical fiber inserted in the groove and a V-groove portion provided ahead of the holder main body for inserting the optical fiber therein, a holder mount for mounting the optical fiber holder thereon, a cleaving blade, a V-groove member for inserting a coated optical fiber therein, and a clamping member for clamping the coated optical fiber inserted in the V-groove member, characterized in that the holder mount has a positioning portion for positioning the optical fiber holder and a supporting portion for supporting the clamping member which is compressed toward the V-groove portion by a spring member and the cleaving blade is positioned interposed between the V-groove portion and the V-groove member and is adapted to make a cleave on the optical fiber clamped between the V-groove portion and the V-groove member.

DETAILED DESCRIPTION OF THE PREFERRED EMBODIMENT

The present invention will be further described hereinafter in connection with the attached drawings.

Figure 1:
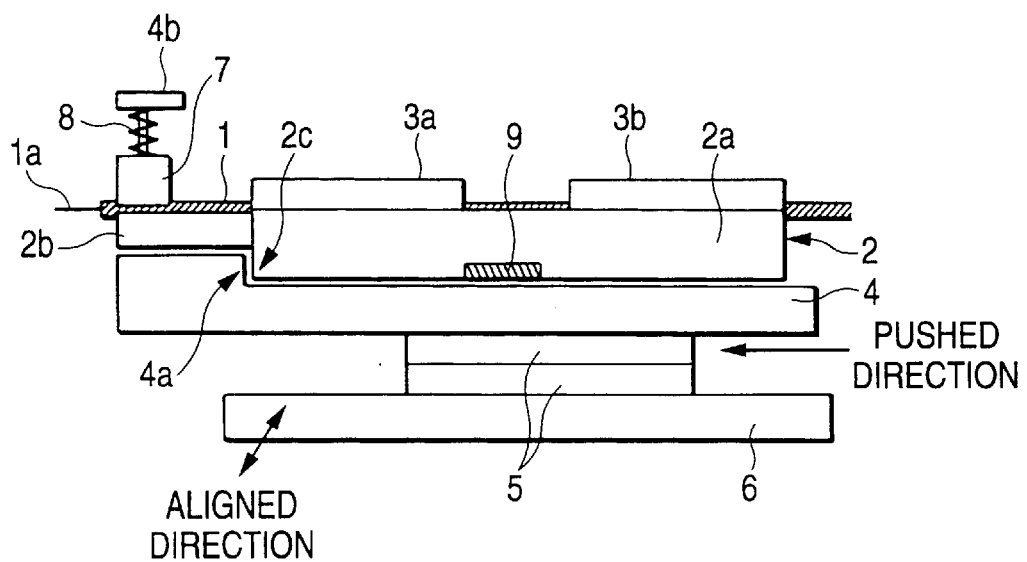
FIGS. 1(A) and 1(B) are schematic diagrams illustrating a mechanism for retaining an optical fiber in an embodiment of the fusion-splicing apparatus according to the present invention.
Figure 1:
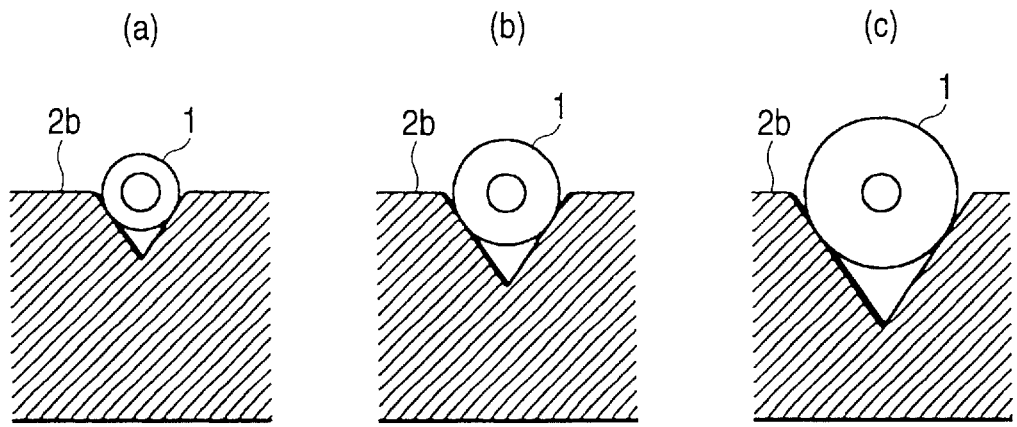

FIG. 1(A) is a schematic diagram illustrating a mechanism for retaining an optical fiber in an embodiment of the fusion-splicing apparatus according to the present invention. In FIG. 1, the reference numeral 1 indicates a coated optical fiber, the reference numeral 1a indicates an optical fiber, the reference numeral 2 indicates a holder, the reference numeral 2a indicates a holder main body, the reference numeral 2b indicates a V-groove portion, the reference numeral 2c indicates a positioning portion, the reference numerals 3a, 3b each indicate a clamping member, the reference numeral 4 indicates a holder mount, the reference numeral 4a indicates a positioning portion, the reference numeral 4b indicates a supporting portion, the reference numeral 5 indicates a slider mechanism, the reference numeral 6 indicates a supporting table, the reference numeral 7 indicates a clamping member, the reference numeral 8 indicates a spring member, and the reference numeral 9 indicates a magnet. In FIG. 1, only one of the two supporting mechanisms is shown.

The holder 2 can clamp the coated optical fiber 1 to be spliced. The holder main body 2a has a V-groove portion 2b provided at the forward end thereof which can receive the coated optical fiber 1. The coated optical fiber 1 is clamped by the clamping member 7. The holder main body 2a has a groove formed also at the rear part following the V-groove portion 2b in which the coated optical fiber 1 can be inserted. The coated optical fiber 1 is clamped by the clamping members 3a, 3b. The groove in the holder main body 2a may be formed extending from the V-groove of the V-groove portion 2b. However, the form of the groove in the holder main body 2a is not limited to V-groove. The groove in the holder main body 2a may have a proper sectional shape such as rectangle. The clamping member 7 is supported in such an arrangement that it is compressed toward the V-groove portion 2b by the spring member 8 against the supporting portion 4b. The supporting portion 4b is attached to the holder mount 4 via an arm member (not shown) extending from the holder mount 4 and thus is integrated to the holder mount 4.

Figure 11:
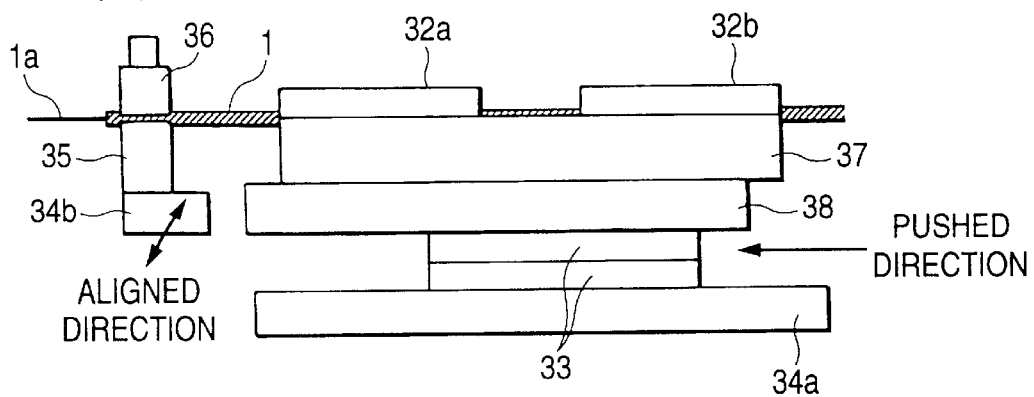
FIGS. 11(A) and 11(B) are schematic diagrams illustrating a conventional holder mechanism.
Figure 11:
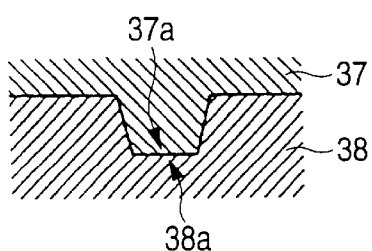

The holder 2 in which the optical fiber 1 is clamped is attached to and positioned on the holder mount 4. As the positioning mechanism there may be used a positioning structure described in connection with FIG. 11(B). In the embodiment shown in FIG. 1, the corner of the holder main body 2a acts as the positioning portion 2c. With the positioning portion 2c, the position portion 4a formed as a step on the holder mount 4 performs positioning in the forward and backward direction (axial direction of optical fiber 1).

The holder main body 2a also has an engagement portion (not shown) and a portion to be engaged so that it can be positioned also in the crosswise direction (direction perpendicular to the axis of optical fiber 1). As the engagement portion and the portion to be engaged there may be used proper engagement structures restricting the crosswise relative movement as well as allowing the forward and backward movement, e.g., raised line extending longitudinally and groove in which the raised line is fitted. In FIG. 1, a clearance is shown provided between the holder 2 and the holder mount 4. However, this clearance is shown for the sake of convenience of display. In practice, the forward and lower portion of the holder main body 2a is brought in close contact with the holder mount 4. The lower portion of the V-groove 2b is brought into close contact with and supported by the holder mount 4. However, it is not necessarily essential that the lower portion of the V-groove portion 2b be brought into close contact with the holder mount 4. For example, so far as the V-groove portion 2b is firmly integrated to the holder main body 2a, the V-groove portion 2b does not need to be supported by the holder mount 4, and there may be a clearance between the V-groove portion 2b and the holder mount 4. However, from the standpoint of strength, the lower portion of the V-groove portion 2b, too, is preferably brought into close contact with and supported by the holder mount 4. A magnet 9 may be embedded in or otherwise attached to a part, e.g., bottom, of the holder so that the holder 2 can be attracted to the holder mount 4 by magnetic force. In this arrangement, the holder mount 4 may be formed by a magnetic material. Alternatively, a magnet-attracting material may be attached to the holder mount 4 at the position thereof corresponding to the magnetic 9.

The holder mount 4 is supported on the supporting table 6 by the slider mechanism 5 in such an arrangement that it can move along the axis of the optical fiber 1 thus clamped. The supporting table 6 and another supporting table (not shown) disposed opposed to the supporting table 6 are arranged such that they can be moved by the respective moving mechanism (not shown) to align the tip of the optical fiber 1a exposed by stripping the coating from the tip of the optical fiber 1 clamped by the respective V-groove portion 2b.

Figure 3:
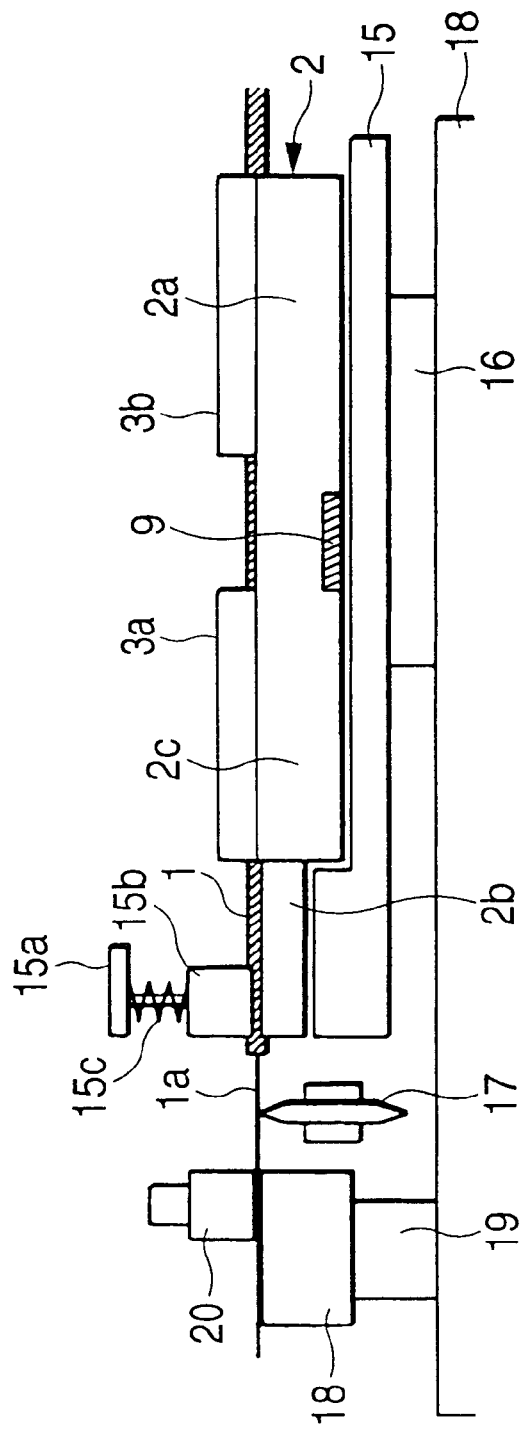
FIG. 3 is a schematic diagram illustrating an embodiment of the cleaving apparatus used in a cleaving step.

As shown in FIG. 1(B), the holder 2 is prepared according to the dimension, etc. of the optical fiber 1 to be spliced. The holder described in connection with FIG. 1(A) is used also in a cleaving apparatus. As shown in FIG. 3, this holder allows accurate positioning of the tip of optical fiber. Also in a stripping apparatus for stripping the coating from the tip of an optical fiber, the use of the foregoing holder makes it possible to strip the coating at a position which is reproducible and accurate. The stripping apparatus and cleaving apparatus will be described hereinafter with reference to step of processing the terminal of optical fiber for the purpose of fusion-splice using the foregoing common holder.

Figure 2:
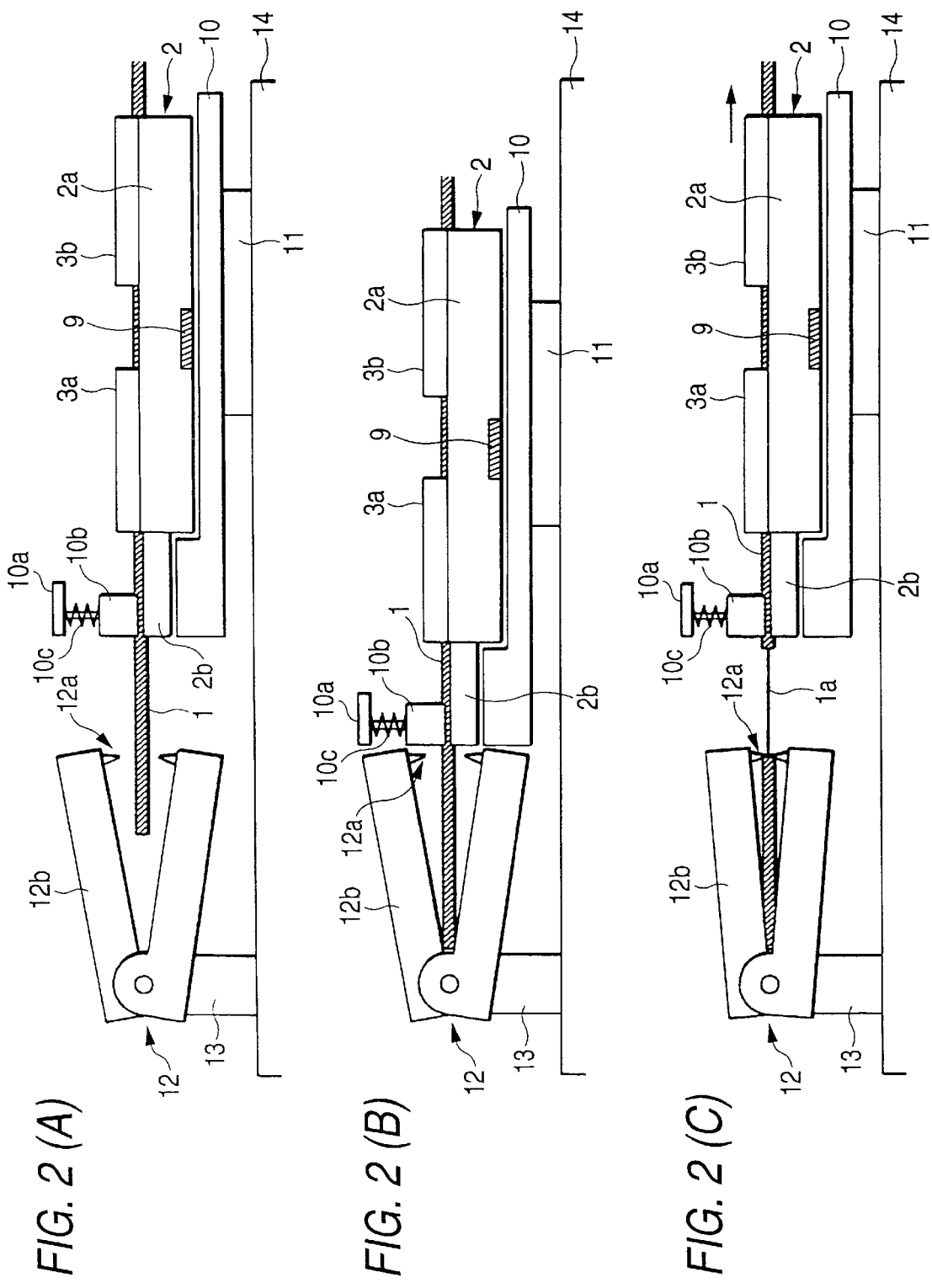
FIGS. 2(A) through 2(C) are schematic diagrams illustrating an embodiment of the stripping apparatus used in a stripping step.

FIG. 2 is a schematic diagram illustrating an embodiment of the stripping apparatus used in a stripping step. Like numerals are used for like parts in FIGS. 1 and 2. The description of parts similar to those of FIG. 1 will be omitted. In FIG. 2, the reference numeral 10 indicates a holder mount, the reference numeral 10a indicates a supporting table, the reference numeral 10b indicates a clamping member, the reference numeral 10c indicates a spring member, the reference numeral 11 indicates a movement mechanism, the reference numeral 12 indicates a stripping portion, the reference numeral 12a indicates a stripping blade, the reference numeral 12b indicates an arm portion, the reference numeral 13 indicates a mount, and the reference numeral 14 indicates a base table.

The holder mount 10 is arranged such that the holder 2 is mounted by the same mounting structure as the holder mount 4 shown in FIG. 1(A). The holder mount 10 is supported on the base table 14 via the movement mechanism 11. The movement mechanism 11 has a driving source (not shown) such as motor so that the holder mount 10 can be moved longitudinally along the axis of the optical fiber 1. The stripping portion 12 has a stripping blade 12a on the arm portion 12b which can be opened and closed. The stripping portion 12 is mounted on the base table 14 via the mount 13.

FIG. 2(A) illustrates how the holder 2 in which an optical fiber 1 is set is mounted on the holder mount 10 of the stripping apparatus. The setting of the optical fiber 1 in the holder 2 is accomplished with the holder main body 2a and the clamping members 3a, 3b. The setting of the optical fiber 1 in the stripping apparatus is accomplished with the V-groove portion 2b and the clamping member 10b. The clamping member 10b is supported on a supporting member (not shown) which is in turn mounted on the holder mount 10. The clamping member 10b is compressed toward the V-groove by the spring member 10C. The optical fiber 1 set in the holder 2 is not removed from the holder 2 until fusion-splice is completed. The position of the optical fiber 1 in the holder mount 10 corresponds to the position at which the optical fiber 1 in the holder 2 is disposed. This position is the reference position of the optical fiber 1. The positioning mechanism for positioning the holder 2 in the holder mount 10 is similar to that shown in FIG. 1(A).

FIG. 2(B) illustrates how the holder mount 10 on which the holder 2 is mounted is moved on the base table 14 by the movement mechanism 11 to the predetermined position at which the striping is effected. Under these conditions, the arm portion 12b of the stripping portion 12 is closed. When the arm portion 12b of the stripping portion 12 is closed, the stripping blade 12a cuts into the coating of the optical fiber 1 to make a cut on the coating of the optical fiber 1. Under these conditions, a part of the coating of the optical fiber 1 is caught by the stripping blade 12a. Interlocking with the cutting action of the arm portion 12b of the stripping portion 12, a start switch (not shown) is turned ON to start heating by a heat source for heating the coating material. Thus, heating to a predetermined temperature is maintained.

As shown in FIG. 2(C), when the holder mount 10 moves backward as shown by the arrow, the coating is stripped from the tip of the optical fiber 1a beginning with the notch. When the holder mount 10 moves further backward to the predetermined position, an electrode retaining and moving portion (not shown) rises up. Electrical discharge is made at the position where the optical fiber 1a of the coated optical fiber 1 is sandwiched by the electrodes. When electrical discharge is made across the electrodes while the holder mount 10 is being moved backward, the remaining of the coating left on the surface of the optical fiber 1a from which the coating has been stripped is burnt away to complete the step of stripping. The cleaning is not limited to electrical discharge. A proper cleaning method may be employed such as ultrasonic cleaning in acetone.

While the present embodiment has been described with reference to the arrangement that the holder mount 10 is moved, relative movement is made between the stripping portion 12 and the holder 2. By way of example, the arrangement may be possible such that only the stripping portion 12 moves or both the stripping portion 12 and the holder 2 move. The clamping member 10b may not be necessarily provided in the stripping apparatus.

FIG. 3 is a schematic diagram illustrating an embodiment of the cleaving apparatus used in a cleaving step. Like numerals are used for like parts in FIGS. 3 and 1(A). The description of parts similar to those of FIG. 1(A) will be omitted. In FIG. 3, the reference numeral 15 indicates a holder mount, the reference numeral 15a indicates a supporting portion, the reference numeral 15b indicates a clamping member, the reference numeral 15c indicates a spring member, the reference numeral 16 indicates a fixing table, the reference numeral 17 indicates a cleaving blade, the reference numeral 18 indicates a V-groove member, the reference numeral 19 indicates a fixing table, and the reference numeral 20 indicates a clamping member.

The holder mount 15 is arranged such that the holder 2 is mounted by the same mounting structure as the holder mount 4 shown in FIG. 1(A). The holder mount 15 is supported on the base table 14 via the fixing table 16. The cleaving blade 17 is provided in such an arrangement that it can move forward and backward in the direction perpendicular to the optical fiber. The position at which cleaving is made is constant in the longitudinal direction of optical fiber. In this arrangement, the optical fiber 1a of the coated optical fiber 1 is cleaved at the tip thereof at an accurately predetermined position with respect to the reference position at which clamping is made by the holder 2.

In order to cleave the optical fiber, the holder 2 is mounted on the holder mount 15 of the cleaving apparatus in such a manner that the optical fiber is kept being clamped by the holder after the coating is stripped from the optical fiber. The positioning mechanism for positioning the holder 2 in the holder mount 15 is the same as the positioning mechanism shown in FIG. 1(A). The cleaving blade 17 moves in the direction perpendicular to the optical fiber 1a thus positioned to make a notch on the optical fiber 1a. It has been here to fore practiced to clamp the optical fiber on the both sides thereof between two V-groove members and a clamping member provided in the cleaving apparatus when a notch is made on the optical fiber by the cleaving blade. However, in the present embodiment, the cleaving apparatus comprises a V-groove member 18 and a clamping member 20 provided closer to the terminal of the optical fiber 1a than the cleaving blade. Thus, the clamp provided on the side of the cleaving blade opposite the V-groove member 18 and the clamping member 20 is arranged such that the coated portion of the optical fiber is clamped by the V-groove portion 2b and the clamping member 15 provided in the holder 2. The clamping member 15b is mounted on the holder mount 15 via a supporting member which is not shown. The clamping member 15b is compressed toward the V-groove by the spring member 15c. After a notch has been made on the optical fiber by the cleaving blade 17, when the cleaving blade 17 is moved backward, an optical fiber bending piece which is not shown comes down. The bending piece presses the optical fiber 1a in between the two clamps to bend the optical fiber. As a result, break occurs in the optical fiber beginning with the notch made by the cleaving blade 17 to cleave the optical fiber. The section thus made is mirror-like. The cleaving of the optical fiber with the cleaving blade is also accomplished by a process which comprises making a cleave on the optical fiber with a cleaving blade while the optical fiber is being clamped and longitudinally tensed. Thus, the present invention is not limited to the process involving breaking by a bending piece.

Thus, the holder keeps the optical fiber 1 set at the pre-determined position. The optical fiber 1 is clamped and cleaved at the holder mount of cleaving apparatus provided in the same dimensional relationship as the holder mount of stripping apparatus. In this arrangement, the positional relationship between the tip of the coating of the optical fiber 1 and the cleaving position of optical fiber 1a is always constant.

At the fusion-splicing step, the holder 2 having the optical fiber 1 clamped and retained at the predetermined cleaving position is mounted on the holder mount 4 disposed on the both sides of the fusion-splicing apparatus shown in FIG. 1(A). The holder keeps the optical fiber 1 set at the predetermined position. This holder is mounted on the holder mount 4 in the fusion-splicing apparatus in the same dimensional relationship as in the holder mount in the stripping apparatus or cleaving apparatus. In this manner, the tip of the optical fiber 1a in the fusion-splicing apparatus is always at the predetermined fusion-splicing position.

The holder 2 will be described hereinafter. As previously mentioned, there are coated optical fibers having various outer diameters, including 0.25 mm, 0.4 mm, 0.9 mm. In the present embodiment, the holder 2 is prepared for each of optical fibers having various outer diameters. In some detail, the depth of the groove for receiving the optical fiber 1 therein is varied according to the outer diameter of the optical fiber to make the height of the central axis of the optical fiber 1 clamped by the holder 2 constant.

FIG. 1(B) is an enlarged sectional view of an essential part of the V-groove portion 2b in which the coated optical fibers 1 having different diameters are clamped. In FIGS. 1(B) (a), (b) and (c), the substrate constituting the V-groove is shown having the same thickness. FIG. 1(B) (a) shows the positional relationship between the V-groove and the optical fiber 1 in a holder for a coated optical fiber 1 having an outer diameter of 0.25 mm. FIG. 1(B) (b) shows the positional relationship between the V-groove and the optical fiber 1 in a holder for a coated optical fiber 1 having an outer diameter of 0.4 mm. FIG. 1(B) (c) shows the positional relationship between the V-groove and the optical fiber 1 in a holder for a coated optical fiber 1 having an outer diameter of 0.9 mm. Even if the outer diameter of the optical fiber 1 varies, the central position of the optical fiber 1 does not vary so far as the optical fiber 1 is positioned in the respective holder. This applies to the groove in the holder main body 2a. The position of the central axis of the optical fiber 1 thus clamped relative to the holder remains constant regardless of the outer diameter of the optical fiber 1. In this arrangement, even if optical fibers having different outer diameters are to be fusion-spliced, it can be dealt with by properly selecting the holder, eliminating the necessity of changing the position of the constituent parts of the fusion-splicing apparatus to advantage.

Figure 4:
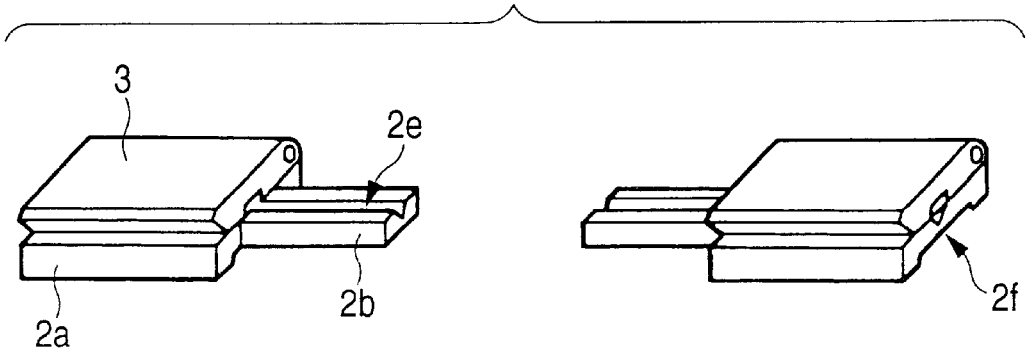
FIGS. 4(A) through 4(C) are perspective views illustrating the schematic structure of the holder of FIG. 1.
Figure 4:
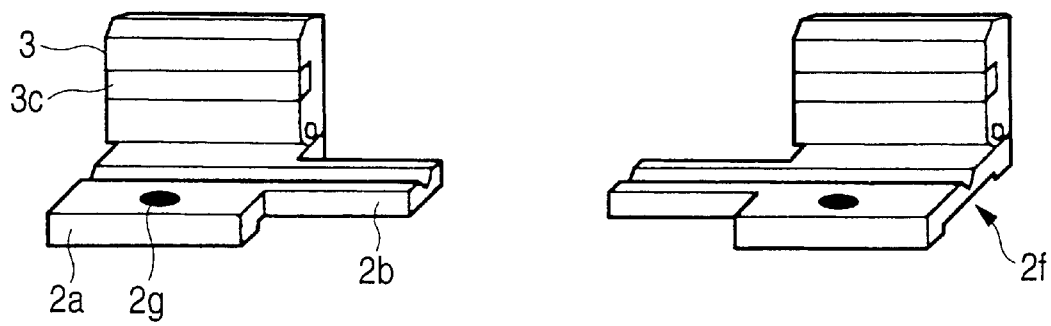
Figure 4:
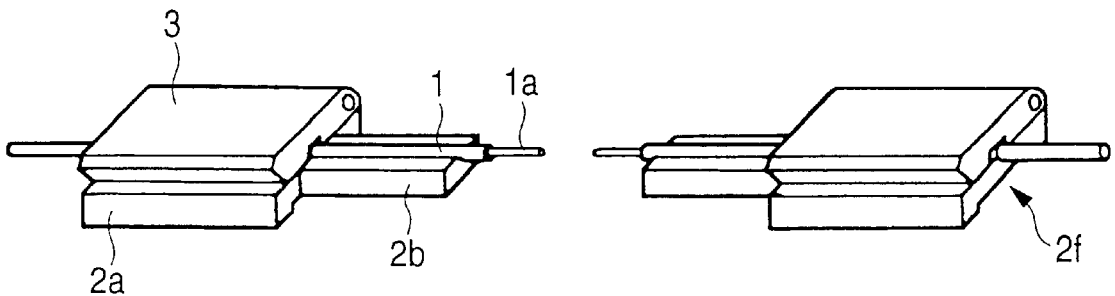

FIG. 4 is a perspective view illustrating the schematic structure of an embodiment of the holder of FIG. 1. FIG. 4(A) illustrates how the clamping member is closed. FIG. 4(B) illustrates how the clamping member is opened. FIG. 4(C) illustrates how the optical fiber is clamped. Like numerals are used for like parts in FIGS. 1 and 4. The description of parts similar to those of FIG. 1 will be omitted. In FIG. 4, the reference numeral 2e indicates a V-groove, the reference numeral 2f indicates a sliding groove, the reference numeral 2g indicates a magnet, the reference numeral 3 indicates a clamping member, and the reference numeral 3c indicates an elastic material.

In the present embodiment, the V-groove 2b is formed integrally with the holder main body 2a as shown in FIGS. 4(A) and 4(B). Further, the V-groove 2e is continuously formed from the forward end of the V-groove portion 2b to the rear end of the holder main body 2a. The clamping member 3 is rotatably mounted on the holder main body 2a. An elastic material which undergoes elastic deformation to press the optical fiber 1, such as natural rubber and synthetic rubber, is embedded in the clamping member 3 at the portion corresponding to the V-groove 2e. The holder 2 has the sliding groove 2f formed on the bottom of the holder 2 over the length of the holder 2. The sliding groove 2f is fitted on a raised line formed having a dimension and shape adapted for the sliding groove 2f of the holder mount (not shown). In this arrangement, the holder 2 is positioned in the axial direction of the optical fiber thus clamped by contacting the perpendicular face thereof with the holder mount so that it can slide along the holder mount.

As shown in FIG. 4(C), while the optical fiber 1 is being clamped by the holder 2, the clamping member 3 is closed and attracted by the magnet 2g to clamp the optical fiber 1. The optical fiber 1 is not moved but is kept at the foregoing pre-determined position.

The holder of the present embodiment is adapted to clamp an optical fiber which is in the form of single-core optical fiber. However, by forming a U-shaped groove in the holder, the holder can be used for an apparatus for fusion-splicing optical fiber ribbon containing planarity of optical fibers. The holder adapted for optical fiber ribbon is arranged such that the groove is formed according to the width of the optical fiber ribbon.

Figure 5:
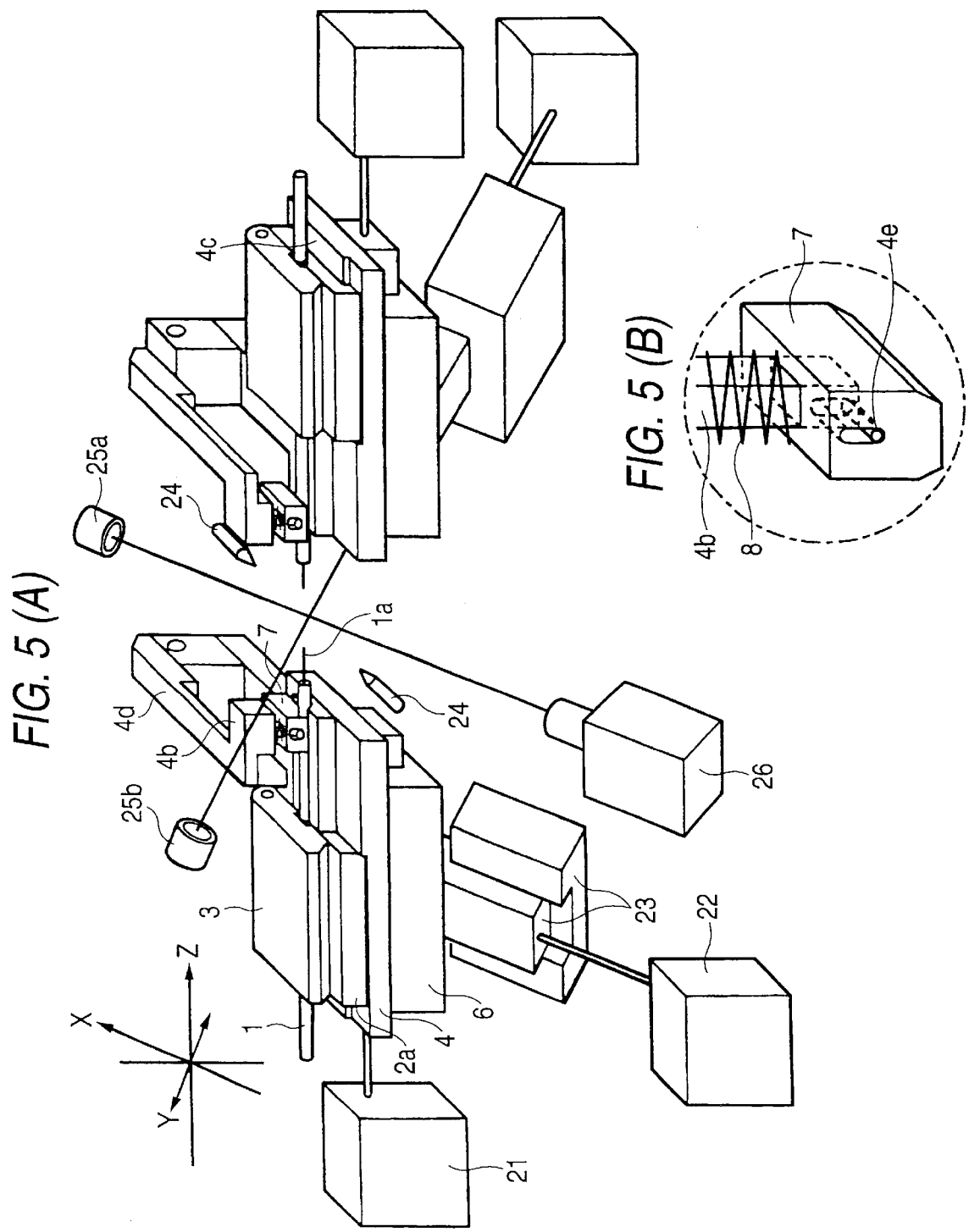
FIGS. 5(A) and 5(B) are perspective views illustrating the schematic structure of a fusion-splicing apparatus comprising the holder of FIG. 4.

FIG. 5(A) is a perspective view illustrating the schematic structure of an embodiment of the fusion-splicing apparatus comprising the holder described in FIG. 4. FIG. 5(B) is an enlarged view illustrating an essential part of the clamping member 7. Like numerals are used for like parts in FIGS. 1 and 5. The description of parts similar to those of FIG. 1 will be omitted. In FIG. 5, the reference numeral 4c indicates a raised line, the reference numeral indicates an arm member, the reference numeral 4e indicates a shaft member, the reference numeral 21 indicates a pushing motor, the reference numeral 22 indicates an aligning motor, the reference numeral 23 indicates a slider mechanism, the reference numeral 24 indicates a discharge electrode, the reference numerals 25a, 25b each indicate a light source, and the reference numeral 26 indicates an image-taking apparatus.

The holder 2 is positioned by the positioning portion 4a and the raised line 4c of the holder mount 4 and is mounted on the holder mount 4 by the attraction force of the magnet as shown in FIG. 1(A). The clamping member 7 is mounted on the forward end of the supporting portion 4b mounted on the forward end of the arm member 4d rotatably mounted on the holder mount 4 in such an arrangement that it moves up and down. As shown in the enlarge view of FIG. 5(B), the supporting portion 4b extends vertically downward to be loosely inserted in a hole formed in the clamping member 7. The shaft member 4e which extends horizontally is attached to the forward end of the supporting portion 4b which extends vertically and is inserted in the clamping member 7. The shaft member 4e is fitted in a long hole formed on the side of the clamping member 7. The clamping member 7 is compressed downward (toward the V-groove) by the spring member 8. In this arrangement, the clamping member 7 comes in good contact with the V-groove 2b under a proper pressure.

The holder mount 4 can push the tip of the optical fiber 1a by a pushing motor 21 during fusion. The supporting table 6 is supported by the slider mechanism 23 and moved by the aligning motor 22. As viewed with the upper surface of the holder mount 4 as the horizontal surface, the optical axis of the light sources 25a and 25b lies at an angle of 45° with respect to the horizontal plane in a plane perpendicular to the optical fiber 1. Thus, the optical axis of the light sources 25a and 25b cross each other at right angle. On the other hand, the direction of movement of both the supporting tables 6 by the slider mechanism 23 are parallel to the optical axis of the light sources 25a and 25b, respectively. In the case of the holder 2 for optical fiber ribbon, no alignment is conducted.

Figure 6:
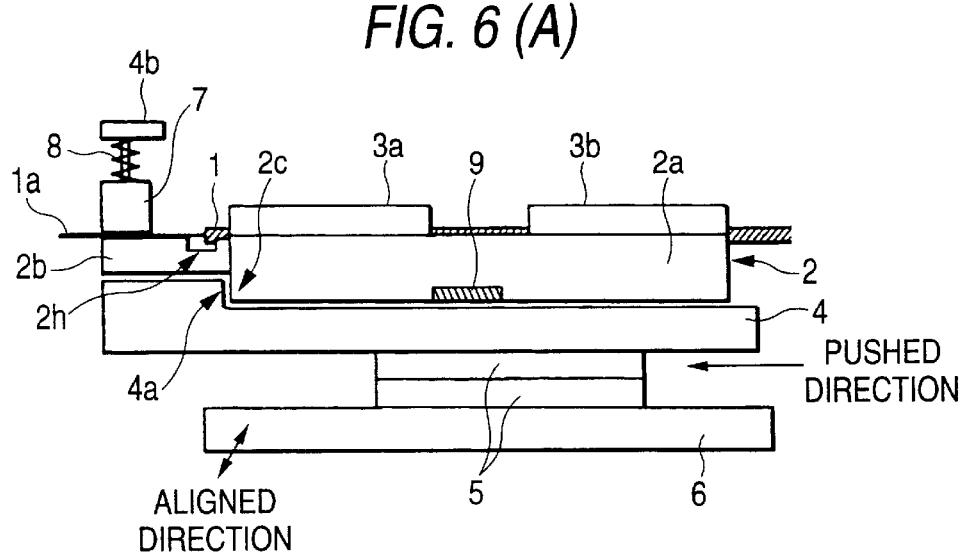
FIGS. 6(A) and 6(B) are schematic diagrams illustrating a mechanism for retaining an optical fiber in another embodiment of the fusion-splicing apparatus according to the present invention.
Figure 6:
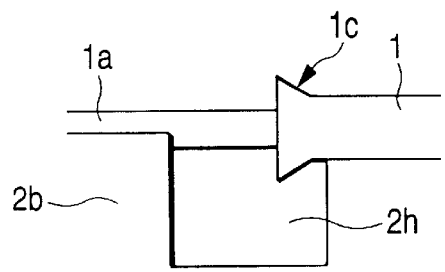

FIG. 6(A) is a schematic diagram illustrating a mechanism for retaining an optical fiber in another embodiment of the fusion-splicing apparatus of the invention. FIG. 6(B) is an enlarged view of an essential part of FIG. 6(A). Like numerals are used for like parts in FIGS. 1 and 6. In FIG. 6, the reference numeral 1c indicates the burr of coating, and the reference numeral 2h indicates a groove portion.

In the holder 2 described in connection with FIG. 1, the coated optical fiber 1 is clamped at the tip by the V-groove portion 2b at the forward end of the holder. The holder 2 of the present embodiment differs from the holder 2 described in connection with FIG. 1 in that the optical fiber 1a which has been exposed by stripping the coated optical fiber 1 is clamped by the V-groove portion 2b at the forward end of the holder. The holder 2 of the present embodiment is not essentially different from the holder 2 of FIG. 1 except the groove portion 2h.

A burr 1c or rise can easily occur at the tip of the coating left unstripped as shown in FIG. 6(B). When the optical fiber 1 having the burr 1c or the like formed thereon is placed in the V-groove portion in which a V-groove for clamping the optical fiber 1a is formed, the optical fiber is raised at the position of the burr 1c or the like. This makes it impossible to accurately position the optical fiber to disadvantage. The groove 2h is formed to allow the burr 1c or the like to escape. The groove 2h can make the axis of the optical fiber straight over the length ranging from the coated portion to the optical fiber 1a.

The holder of the present embodiment is adapted to clamp the optical fiber which has been stripped at the tip thereof. Accordingly, this holder cannot be used for stripping apparatus. This is because when the optical fiber 1 is clamped by the holder 2, the V-groove portion 2b prevents the coating from being stripped at the groove 2h. As described in connection with FIG. 3, the tip of the optical fiber 1a can be cleaved at the predetermined position with respect to the reference position with the holder 2 having the optical fiber 1 clamped therein mounted on the holder mount 10 of the cleaving apparatus. Subsequently, the holder 2 is removed from the holder mount 10 with the optical fiber 1 kept clamped by the holder 2. Thereafter, as described in connection with FIGS. 1 and 3, fusion-splice can be made with the holder 2 mounted on the holder mount 4 described in connection with FIG. 6 and the tip of the optical fiber 1a in the fusion-splicing apparatus is always at the predetermined fusion-splicing position.

The V-groove in the V-groove portion 2b of the holder 2 of the present embodiment is designed such that the position of the central axis of the optical fiber is constant independent of the cladding diameter of the optical fiber to be clamped as shown in FIG. 1(B). Further, the groove in the holder main body 2a in which the optical fiber 1 is clamped is designed such that the central axis of the optical fiber is at the same position for all the holders independent of the outer diameter of optical fiber as described in connection with FIG. 1(B).

The present embodiment is not limited to single-core optical fiber. By providing V-grooves or the like in number according to the number of optical fibers in a ribbon, the present embodiment can be applied to optical fiber ribbon. V-grooves or the like provided in the arrangement for optical fiber ribbon are preferably parallel to each other. The pitch of V-grooves or the like in the holder which is applied to optical fiber ribbon is arranged the same as the pitch of the optical fibers of the optical fiber ribbon.

Figure 7:
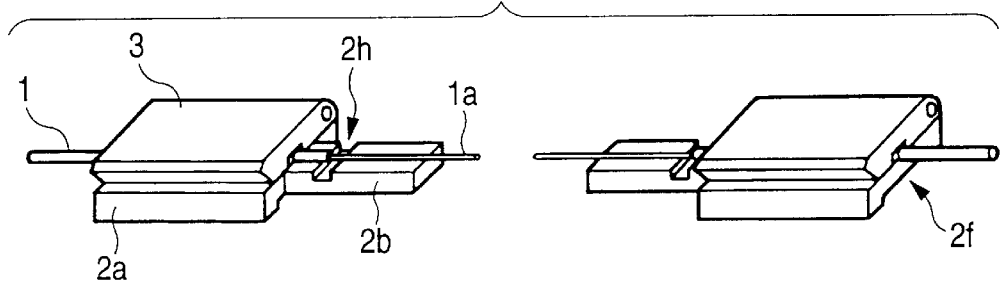
FIG. 7 is a perspective view illustrating the schematic structure of an embodiment of the holder of FIG. 6.

FIG. 7 is a perspective view illustrating the schematic structure of an embodiment of the holder described in connection with FIG. 6. FIG. 7 illustrates how the optical fiber is clamped. Like numerals are used for like parts in FIGS. 4, 6 and 7. The description of parts similar to those of FIGS. 4 and 6 will be omitted.

The holder of the present embodiment is similar to that of the embodiment shown in FIG. 4 but differs from the embodiment shown in FIG. 4 in that the optical fiber 1a which has been exposed by stripping the coated optical fiber 1 is clamped by the V-groove portion 2b at the forward end of the holder and a groove 2h is provided. Thus, the present embodiment is not essentially different from the embodiment shown in FIG. 4. Accordingly, the detailed portions which are not shown in FIG. 7 can be appreciated from FIG. 4.

Figure 8:
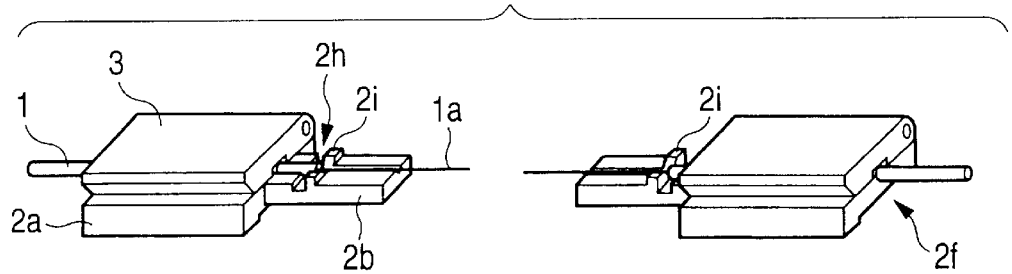
FIG. 8 is a perspective view illustrating the schematic structure of a holder comprising a stopper portion.
Figure 9:
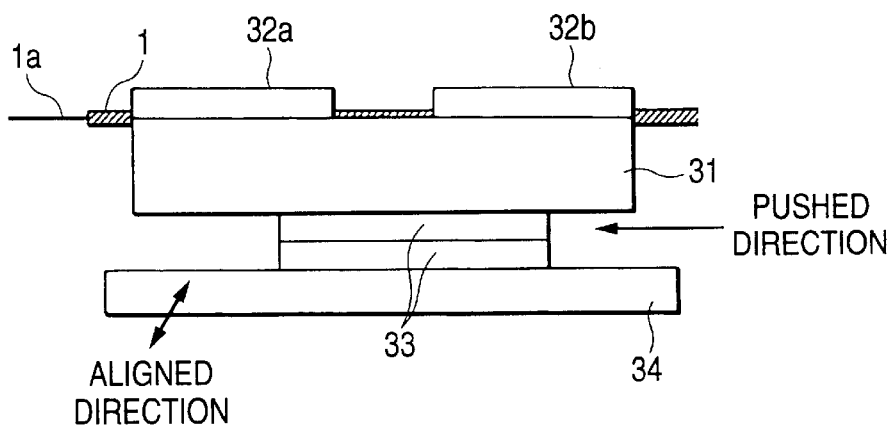
FIG. 9 is a diagram illustrating a structure for supporting an optical fiber in a conventional fusion-splicing apparatus.
Figure 10:
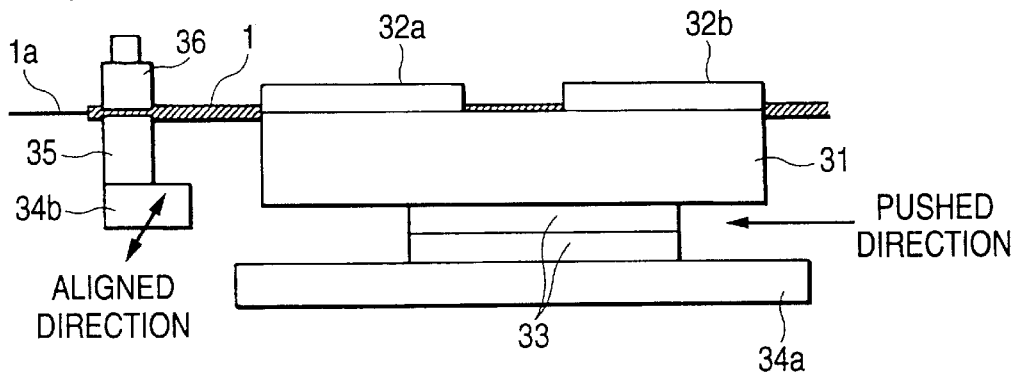
FIG. 10 is a diagram illustrating a holder mechanism in a conventional fusion-splicing apparatus.

FIG. 8 is a perspective view illustrating the schematic structure of an embodiment of the holder described in connection with FIG. 6. FIG. 8 illustrates how the optical fiber is clamped. Like numerals are used for parts in FIGS. 4, 6, 7 and 8. The description of parts similar to those of FIGS. 4, 6 and 7 will be omitted.

The holder of the present embodiment is similar to that of the embodiment shown in FIG. 7 but differs from that of the embodiment shown in FIG. 8 in that a V-shaped stopper portion 2i is provided at the forward end of the holder. By making a V-shaped cut on the central part of the stopper 2i, the optical fiber can be guided by the V-shaped cut and thus can be easily set in the V-groove 2b. Further, since the stopper portion 2i makes positioning such that the tip of the coated optical fibers 1 are brought into contact with each other, the length of the optical fiber which has been cleaved or the distance from the holder to the fusion-splicing position can be always constant.

As mentioned above, in accordance with the present invention, an optical fiber can be prevented from buckling when pushed during fusion. The present invention can deal with coated optical fibers having different outer diameters and optical fibers having different outer diameters. As a result, the tip of the optical fiber can be accurately positioned during fusion-splice. Further, the present invention makes it unnecessary to adjust the range of spliced part to be image-taken under microscope. Thus, the present invention has an extremely great industrial value.

What is claimed is:

1. An optical fiber holder which is used for a stripping apparatus, a cleaving apparatus and a fusion-splicing apparatus in common, comprising:

a holder main body having a groove for inserting an optical fiber therein and a first clamping member for clamping said optical fiber in said groove;

a V-groove portion provided ahead of said holder main body, said V-groove portion having a v-groove for inserting said optical fiber therein and a second clamping member for clamping said optical fiber, wherein said second clamping member is compressed toward said V-groove portion by a spring member; and a holder mount on which said V-groove portion is mounted in the stripping apparatus, cleaving apparatus or fusion-splicing apparatus, said groove and said v-groove being configured so that the central axis of the optical fiber clamped in these grooves is in the same position independent of the outer diameter of optical fiber.

2. A method for splicing optical fibers which comprises effecting a sequence of steps involving coating, stripping, cleaning, cleaving and fusion-splice using the optical fiber holder defined in claim 1 without removing said optical fiber from said optical fiber holder to splice optical fibers.

3. A fusion-splicing apparatus comprising an optical holder according to claim 1, wherein said holder mount includes a positioning portion for positioning said optical fiber holder and a supporting portion for supporting said second clamping member.

4. A cleaving apparatus comprising:

an optical fiber holder including a holder main body having a groove for inserting an optical fiber therein and a clamping member for clamping said optical fiber inserted in said groove and a V-groove portion provided ahead of said holder main body for inserting the optical fiber therein;

a holder mount for mounting said optical fiber holder thereon;

a cleaving blade;

a V-groove member for inserting a coated optical fiber therein; and a clamping member for clamping the coated optical fiber inserted in said V-groove member, wherein said holder mount has a positioning portion for positioning said optical fiber holder and a supporting portion for supporting said clamping member which is compressed toward said V-groove portion by a spring member, and said cleaving blade is positioned interposed between said V-groove portion and said V-groove member and is adapted to make a cleave on the optical fiber clamped between said V-groove portion and said V-groove member.

5. An optical fiber holder which is used for cleaving apparatus and fusion-splicing apparatus in common, comprising:

a holder main body having a groove for inserting an optical fiber therein and a first clamping member for clamping said optical fiber inserted in said groove;

a V-groove portion provided ahead of said holder main body, said V-groove portion having a v-groove for inserting said optical fiber therein and a second clamping member for clamping said optical fiber, wherein said second clamping member is compressed toward said V-groove portion by a spring member; and a holder mount on which said V-groove portion is mounted in a cleaving apparatus or fusion-splicing apparatus, said groove and said v-groove being configured so that the central axis of the optical fiber clamped in these grooves is in the same position independent of the outer diameter of optical fiber.

6. A method for splicing optical fibers which comprises effecting a sequence of steps involving cleaving and fusion-splice using the optical fiber holder defined in claim 5 without removing said optical fiber from said optical fiber holder to splice optical fibers.

* * * * *

UNITED STATES PATENT AND TRADEMARK OFFICE
CERTIFICATE OF CORRECTION

PATENT NO. : 6,668,128 B2
DATED : December 23, 2003
INVENTOR(S) : Kazunari Hattori et al.

It is certified that error appears in the above-identified patent and that said Letters Patent is hereby corrected as shown below:

<u>Title page,</u>
Item [56], References Cited, FOREIGN PATENT DOCUMENTS, change "9-113572" to -- 9-113752 --.

Signed and Sealed this

First Day of November, 2005

JON W. DUDAS
*Director of the United States Patent and Trademark Office*